US008739386B2

(12) United States Patent
Wein et al.

(10) Patent No.: US 8,739,386 B2
(45) Date of Patent: Jun. 3, 2014

(54) METHOD FOR MAGNETICALLY ATTACHING AND DETACHING PORTABLE ITEMS

(75) Inventors: Michael Wein, Houston, TX (US); Stephen Douglas Alexander, Houston, TX (US)

(73) Assignee: The Dual Magnetic Interlocking Pin System, LLC, Houston, TX (US)

( * ) Notice: Subject to any disclaimer, the term of this patent is extended or adjusted under 35 U.S.C. 154(b) by 944 days.

(21) Appl. No.: 12/499,780

(22) Filed: Jul. 8, 2009

(65) Prior Publication Data

US 2010/0263172 A1 Oct. 21, 2010

Related U.S. Application Data

(63) Continuation-in-part of application No. 12/247,962, filed on Oct. 8, 2008, which is a continuation-in-part of application No. 12/041,994, filed on Mar. 4, 2008, now abandoned, which is a continuation-in-part of application No. 11/695,837, filed on Apr. 3, 2007, now abandoned.

(60) Provisional application No. 61/103,906, filed on Oct. 8, 2008.

(51) Int. Cl.
*B23P 11/00* (2006.01)
*A24F 15/00* (2006.01)

(52) U.S. Cl.
USPC ............. 29/525.01; 29/428; 29/469; 206/242

(58) Field of Classification Search
USPC ......... 29/525.01, 469, 428, 426.1; 248/206.5, 248/309.4, 683; 70/459, 456 R, 456 B; 24/303, 66.1; 63/900; 292/251.5; 40/600; 206/242
See application file for complete search history.

(56) References Cited

U.S. PATENT DOCUMENTS

| | | | | | |
|---|---|---|---|---|---|
| 1,904,193 | A | * | 4/1933 | Berg | 206/91 |
| 2,070,121 | A | | 2/1936 | Gibson | |
| 2,047,696 | A | * | 7/1936 | Lozo | 206/95 |
| 2,315,964 | A | * | 4/1943 | Johnson | 206/95 |
| 2,323,342 | A | * | 7/1943 | McManus et al. | 428/191 |
| 2,557,825 | A | | 4/1949 | Hotze | |
| 2,975,497 | A | * | 3/1961 | Budreck | 24/303 |

(Continued)

FOREIGN PATENT DOCUMENTS

| | | | | | |
|---|---|---|---|---|---|
| FR | 2592985 | A | * | 7/1987 | H01F 7/02 |
| FR | 2978529 | A1 | * | 2/2013 | A24F 15/18 |

(Continued)

*Primary Examiner* — Essama Omgba
(74) *Attorney, Agent, or Firm* — Buskop Law Group, PC; Wendy Buskop

(57) ABSTRACT

A method for removably attaching portable items which are usable with each other. The method comprises the steps of removably inserting a first magnetically attractable component into a first portable item, thereby forming a first magnetically attractable item; removably inserting a second magnetically attractable component into a second portable item, thereby forming a second magnetically attractable item; allowing the first magnetically attractable item to magnetically engage the second magnetically attractable item, thereby forming a detachable magnetic assembly, wherein the detachable magnetic assembly can magnetically engage a magnetic surface, enabling the detachable magnetic assembly to be removably secured to the magnetic surface, and enabling one of the first or second portable items to be removed from the detachable magnetic assembly while maintaining the other first or second portable item in engagement with the magnetic surface.

1 Claim, 9 Drawing Sheets

(56) References Cited

U.S. PATENT DOCUMENTS

| | | | | | |
|---|---|---|---|---|---|
| 3,041,697 | A * | 7/1962 | Budreck | 24/303 |
| 3,111,736 | A * | 11/1963 | Budreck | 24/303 |
| 3,177,546 | A * | 4/1965 | Bey | 24/303 |
| 3,192,894 | A | 7/1965 | Staver | |
| 3,204,601 | A | 9/1965 | Staver | |
| 3,763,996 | A * | 10/1973 | Shepherd | 206/87 |
| 3,815,066 | A | 6/1974 | Vinal | |
| 3,906,763 | A | 9/1975 | Bochory | |
| 4,081,114 | A | 3/1978 | Inoue | |
| 4,230,224 | A * | 10/1980 | Weeks | 206/87 |
| 4,700,436 | A * | 10/1987 | Morita | 24/303 |
| 4,875,654 | A * | 10/1989 | Chandonnet et al. | 248/467 |
| 4,880,377 | A * | 11/1989 | Ficho | 431/126 |
| 5,047,061 | A | 9/1991 | Brown | |
| 5,450,658 | A * | 9/1995 | Hicks | 24/303 |
| 5,624,410 | A * | 4/1997 | Tsukada et al. | 604/256 |
| 5,664,298 | A * | 9/1997 | Nessar-Ivanovic | 24/303 |
| 5,675,874 | A * | 10/1997 | Chen | 24/303 |
| 5,740,557 | A | 4/1998 | Reid et al. | |
| 5,749,447 | A * | 5/1998 | Hersh et al. | 190/112 |
| 5,794,767 | A * | 8/1998 | Wilson | 206/37 |
| 5,926,925 | A * | 7/1999 | Hicks | 24/303 |
| 5,967,767 | A * | 10/1999 | Khon | 431/152 |
| 5,975,661 | A | 11/1999 | Jeziorowski et al. | |
| 5,987,715 | A * | 11/1999 | Khon | 24/303 |
| 5,992,807 | A * | 11/1999 | Tarulli | 248/206.5 |
| 6,305,656 | B1 * | 10/2001 | Wemyss | 248/309.4 |
| 6,306,332 | B1 | 10/2001 | Angellotti | |
| 6,336,567 | B1 * | 1/2002 | Hyobu | 220/230 |
| 6,643,845 | B2 * | 11/2003 | O'Dea et al. | 2/161.6 |
| 6,644,470 | B1 * | 11/2003 | Grayson | 206/92 |
| 6,694,779 | B1 * | 2/2004 | Dreger | 63/33 |
| 6,741,150 | B2 * | 5/2004 | Holmes et al. | 335/207 |
| 6,796,344 | B2 * | 9/2004 | Chen et al. | 150/113 |
| 6,848,288 | B1 | 2/2005 | Derman | |
| 6,866,237 | B2 * | 3/2005 | Dagan | 248/441.1 |
| 6,904,710 | B2 * | 6/2005 | Lawrence et al. | 40/665 |
| 7,172,101 | B2 * | 2/2007 | Find | 222/562 |
| 7,496,991 | B2 * | 3/2009 | Avery | 24/3.3 |
| 7,527,844 | B2 * | 5/2009 | Tallier et al. | 428/43 |
| 7,698,789 | B2 * | 4/2010 | Cserpes | 24/303 |
| 8,001,671 | B2 * | 8/2011 | Mitchell | 29/525.01 |
| 8,016,255 | B2 * | 9/2011 | Lin | 248/206.5 |
| 8,205,846 | B2 * | 6/2012 | Glunk | 248/309.4 |
| 8,210,572 | B2 * | 7/2012 | Davis | 285/9.1 |
| 2001/0030481 | A1 | 10/2001 | Itami et al. | |
| 2002/0112323 | A1 | 8/2002 | Nire | |
| 2002/0130231 | A1 * | 9/2002 | Winnard | 248/206.5 |
| 2002/0170147 | A1 * | 11/2002 | Heller | 24/3.3 |
| 2003/0047578 | A1 * | 3/2003 | Barnett | 224/562 |
| 2003/0121804 | A1 * | 7/2003 | Bahar et al. | 206/242 |
| 2003/0197042 | A1 * | 10/2003 | Warren | 224/183 |
| 2004/0041066 | A1 * | 3/2004 | Bell | 248/314 |
| 2004/0173719 | A1 * | 9/2004 | Mitchell | 248/311.2 |
| 2005/0006547 | A1 * | 1/2005 | Exler | 248/311.2 |
| 2005/0056646 | A1 * | 3/2005 | Gary | 220/483 |
| 2005/0056655 | A1 * | 3/2005 | Gary | 220/737 |
| 2005/0072707 | A1 * | 4/2005 | Bahar et al. | 206/459.1 |
| 2005/0081235 | A1 | 4/2005 | Raguin | |
| 2005/0139558 | A1 | 6/2005 | Kephart | |
| 2005/0142316 | A1 * | 6/2005 | Tallier et al. | 428/40.1 |
| 2005/0156085 | A1 * | 7/2005 | Radovan | 248/110 |
| 2006/0110188 | A1 | 5/2006 | Martin | |
| 2006/0201956 | A1 * | 9/2006 | Romo | 220/737 |
| 2007/0056320 | A1 * | 3/2007 | Azar | 63/3 |
| 2007/0064196 | A1 | 3/2007 | Avery | |
| 2007/0114351 | A1 * | 5/2007 | Mitchell | 248/311.2 |
| 2007/0137658 | A1 * | 6/2007 | Molloy | 131/187 |
| 2007/0176069 | A1 * | 8/2007 | Mitchell | 248/311.2 |
| 2007/0176070 | A1 * | 8/2007 | Mitchell | 248/311.2 |
| 2007/0289348 | A1 * | 12/2007 | Wu | 70/456 R |
| 2008/0060175 | A1 | 3/2008 | Barvosa-Carter et al. | |
| 2008/0128300 | A1 * | 6/2008 | Bahar et al. | 206/242 |
| 2008/0134474 | A1 * | 6/2008 | Uryasov | 24/303 |
| 2008/0248434 | A1 | 10/2008 | Wein | |
| 2008/0284586 | A1 | 11/2008 | Chang | |
| 2009/0127417 | A1 * | 5/2009 | Mitchell | 248/309.4 |
| 2009/0250575 | A1 * | 10/2009 | Fullerton et al. | 248/206.5 |
| 2010/0024175 | A1 * | 2/2010 | Cserpes | 24/303 |
| 2010/0102182 | A1 * | 4/2010 | Lin | 248/206.5 |
| 2010/0116955 | A1 * | 5/2010 | Hayes et al. | 248/206.5 |
| 2010/0270184 | A1 * | 10/2010 | McKenzie et al. | 206/242 |
| 2010/0276313 | A1 * | 11/2010 | Nakano et al. | 206/268 |
| 2011/0043749 | A1 * | 2/2011 | Alley | 351/111 |
| 2011/0056437 | A1 * | 3/2011 | Sprung | 119/51.04 |
| 2011/0266166 | A1 * | 11/2011 | Deutsh et al. | 206/90 |
| 2011/0308048 | A1 * | 12/2011 | Raccah | 24/303 |
| 2011/0314643 | A1 * | 12/2011 | Huang | 24/303 |
| 2012/0066872 | A1 * | 3/2012 | Eisenberger | 24/303 |
| 2012/0212339 | A1 * | 8/2012 | Goldblatt | 340/539.11 |

FOREIGN PATENT DOCUMENTS

| | | | | | |
|---|---|---|---|---|---|
| GB | 2299212 | A * | 9/1996 | A24F 47/00 |
| TW | 47/00 | * | 5/2000 | A24F 47/00 |
| WO | WO 2011005855 | A1 * | 1/2011 | B65D 85/10 |

* cited by examiner

METHOD FOR MAGNETICALLY ATTACHING AND DETACHING PORTABLE ITEMS

CROSS-REFERENCE TO RELATED APPLICATIONS

This application is a continuation in part of U.S. patent application Ser. No. 12/247,962 filed on Oct. 8, 2008, entitled "Dual Magnetic Interlocking Pin System", which is a continuation in part of abandoned U.S. patent application Ser. No. 12/041,994 filed on Mar. 4, 2008, Entitled "Magnetic Lighter", which is a Continuation in Part of abandoned U.S. patent application Ser. No. 11/695,837 filed Apr. 3, 2007, Entitled "Magnetic Keychain Lighter". This application also claims the benefit of U.S. Provisional Patent Application Ser. No. 61/103,906 filed on Oct. 8, 2008, entitled "Kits For Quick Attaching And Disconnecting An Item". These references are incorporated herein.

FIELD

The present embodiments generally relate to a method for removably attaching and detaching two or more items using magnetically attractable components.

BACKGROUND

A need exists for a method for removably attaching a first portable item to a second portable item, wherein the second portable item is usable with the first portable item.

A need exists for a method allowing at least two portable items to remain attached, preventing the items from getting lost, and providing an easy and efficient way for attaching and detaching the portable items while carrying them.

A need exists for a method that allows users to avoid spending time looking for lost or misplaced items, thereby saving time and cost in not having to replace these items.

A need exists for keeping two or more items removably attached, thereby enabling greater organization of homes, vehicles, offices, and other areas.

The present embodiments meet these needs.

BRIEF DESCRIPTION OF THE DRAWINGS

The detailed description will be better understood in conjunction with the accompanying drawings as follows.

Figure 1:
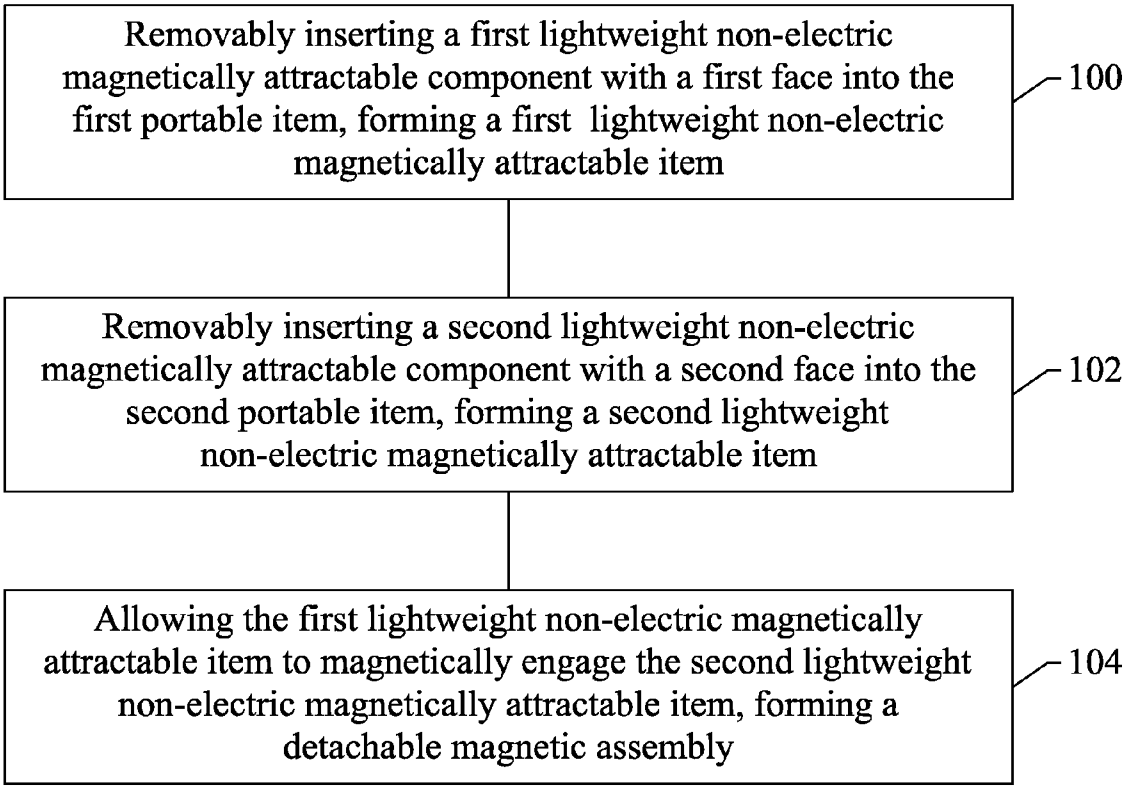
FIG. 1 is a flow chart showing an embodiment of the steps of the present method.

The present embodiments are detailed below with reference to the listed Figures.

DETAILED DESCRIPTION OF THE EMBODIMENTS

Before explaining the present method in detail, it is to be understood that the method is not limited for use with the particular embodiments described and that it can be practiced or carried out in various ways.

Items that are small and compact in size are often lost or misplaced such as a medical inhaler, a wallet, a lighter, a package of cigarettes, car keys, a light used to illuminate car keys. Once lost or misplaced, these items are not easily found and are usually replaced to avoid the consumer's time spent on trying to relocate these items. In the case of an inhaler, lost time, could result in a serious health hazard or even in death.

The present embodiments relate to a method for removably attaching a first portable item to a second portable item, wherein the second portable item is usable with the first portable item.

The present method prevents items from being lost by keeping at least two items removably attached or associated with one another.

The present method enables two related items that are usable with one another to remain associated with one another. For example, the present method can be used to keep a lighter removably attached to a package of cigarettes so that when the items are utilized by a user, the items are together in one place.

The present method can provide functional advertising by use of printed messages, coupons, or rebates. The method allows a manufacturer to co-brand with other suppliers easily because two different items supplied by two different suppliers can be removably attached.

The present method can provide a tracking system for users of detachable magnetic assemblies usable with the present method.

The method allows for stacking and docking of combinations of items into one place. For example, a metal pill box can be removably connected to a clock with a metal housing for keeping track of the time when pills need to be taken, which can in turn be removably connected to a 911 emergency calling transmitter for use in medical emergencies. The above example is particularly usable for handicapped people or the elderly, however it is only an example, and the present method is not limited to this particular use or embodiment.

The method allows users to pair like items for higher organization within vehicles, homes, offices, and other spaces. The method can be used in the refrigerator for better stacking of items, saving energy and fuel.

The method allows unsafe products to be kept high, out of the reach of children. For example, a cigarette lighter along with a package of cigarettes can be removably attached to a magnetic surface such as a refrigerator, at a suitable height to be out of the reach of children.

The method allows users to retain products for longer periods of time, and to replace them less often because users are less likely to loose the items. The method prevents unnecessary repurchasing of items due to misplacement.

A first magnetically attractable component with a first face can be removably inserted into the first portable item forming a first magnetically attractable item. The first face can have a height between about 0.3 inch to about 12 inches and a length between about 0.3 inch to about 12 inches.

A second magnetically attractable component with a second face can be removably inserted into the second portable item forming a second magnetically attractable item. The second face can have a height between about 0.3 inch to about 12 inches and a length between about 0.3 inch to about 12 inches. In one or more embodiments, the first magnetically attractable item and the second magnetically attractable item can have a thickness of about 0.001 inches to 0.5 inches.

The magnetically attractable components can be inserted into the portable items within about 1 centimeter of an outer surface of the portable items. Further, the magnetically attractable components can weigh less than five pounds. The first and second magnetically attractable items as well as the first and second magnetically attractable components can be lightweight and non-electric.

The first and second faces can each further have an area of contact of at least one centimeter. The areas of contact be in the shape of a circle, a rectangle, a square, a polygon, an ellipse, or a curvilinear shape. The first and second faces can have perforations, undulations, or combinations thereof.

The areas of contact of the lightweight non-electric magnetically attractable components can be the portions of the lightweight non-electric magnetically attractable components which magnetically engage one another in operation.

The first magnetically attractable item can magnetically engage the second magnetically attractable item, forming a detachable magnetic assembly.

The detachable magnetic assembly therefore comprises the first and second portable items.

The detachable magnetic assembly can be adapted to magnetically engage a magnetic surface, enabling the detachable magnetic assembly to be removably secured to the magnetic surface. The method can include the step of inserting a third lightweight non-electric magnetically attractable component with a third face into the first portable item, forming a detachable magnetic assembly adapted to magnetically engage a magnetic surface. The method can further include the step of magnetically engaging the detachable magnetic assembly to the magnetic surface.

The second portable item can be removed from the first portable item, while the first portable item is maintained in engagement with the magnetic surface.

The first magnetically attractable component can be a plate or a magnet.

The first portable item can be a cigarette package, a tobacco pouch, a cigar package, a cigar holder, a cigar box, a cigar humidor, while the second portable item can be a cigarette lighter, a book of matches, or a box of matches. The cigar holder can be a box formed by a cigar manufacturer to hold at least one cigar.

The first portable item can be a notebook, a book, or a binder while the second portable item can be a writing utensil or a USB drive. The first portable item can be a lip care product, a cosmetic product, glasses and the second portable item can be a mirror. The first portable item can be a set of keys and the second portable item can be a flashlight or a wallet. The first portable item can be a medical inhaler or a pill box, and the second portable item can be an emergency transmitter or a clock.

The method can further include using the second lightweight magnetically attractable component as a fastening means, which can be disposed on any side and/or face of the first portable item. As an example, the first portable item can be a cigarette box with a lid and the second portable item can be a lighter. The first lightweight non-electric magnetically attractable component can comprise two pieces, wherein one piece of the first lightweight non-electric magnetically attractable component is disposed on the flap of the cigarette box and the other piece of the first lightweight non-electric magnetically attractable component is disposed below the flap of the cigarette box. When the flap of the cigarette box is closed the second lightweight non-electric magnetically attractable component can be magnetically engaged with both the pieces of the first lightweight non-electric magnetically attractable component, thereby preventing the flap of the cigarette box from being opened.

The detachable magnetic assembly can be connected to a third portable item, wherein the first portable item can have a third magnetically attractable component and the third portable item can have a fourth magnetically attractable component. The third portable item can be a cigar cutter, including a straight cut cigar cutter, a punch out cigar cutter, or a V-cut cigar cutter. The third portable item can further be a package of cigarette rolling papers.

The magnetic surface can be a car visor clip for a car, a refrigerator, a lamp, a table, or a metal desk. The magnetic surface can further be a surface in a drinking establishment with material properties that attract a magnetic, such as a bar disposed along a bar top, a bar stool, other another surface.

The first magnetically attractable component can be inserted into a chamber between the first portable item and a clear film enveloping a packaging of the first portable item. Alternatively the first magnetically attractable component can be inserted into a packaging of the first portable item.

The second magnetically attractable component can be inserted within the second portable item or can be disposed on the surface of the second portable item.

The first and second magnetically attractable components can be composed of a reusable and recyclable material and can be lightweight. The first and second magnetically attractable components can be non-electric. The first and second magnetically attractable components can be a steel plate, a bottle opener, a metal shaped object, a cigar cutter, a magnet, or a ferromagnetic material.

A coupon or a rebate amount can be printed onto the first and second faces to encourage recycling of the magnetically attractable components. Further, a message can be printed onto the first and second faces of each magnetically attractable components. The message can be a warning, an advertisement, a drug delivery instruction, an educational saying, an individually personalized label, a company brand, a religious phrase, an inspirational phrase, a phrase, or combinations thereof.

An embodiment can contemplate that the magnetically attractable components can be coated with a material having at least one property different from the lightweight non-electric magnetically attractable components such as impact resistance, fire retardance, anti-static properties, or combinations thereof. The lightweight non-electric magnetically attractable components can also be encapsulated. The coating or encapsulation can be rubber, leather, urethane, an epoxy, ceramic, a glass, a composite, a polymer, a powder coating, plastic, wood, paint, ink, paper, a non-ionic attracting material, or combinations thereof.

The magnetically attractable components can comprise a global positioning system transmitter enabling the detachable magnetic assembly to be tracked using a GPS satellite network that is in communication with a global communication network. The global communication network can further be in communication with at least one processor associated with at least one data storage, wherein the data storage has computer instructions instructing the processor to operate an executive dashboard on a client devices, showing worldwide usage of each detachable magnetic assembly.

The global communication network can be any form of communication network including internet based communication, telephone line communication, cable wire communication, cellular network communication, or combinations thereof.

The processor can be a CPU commonly used in computers. The data storage can be any type of suitable digital data storage device including RAM type memory. The client device 61 can be a computer, a laptop, a cellular based communications device, a cellular phone, or any other suitable or similar device. The executive dashboard 60 can be a monitor, a screen, a display, a television, or any other suitable or similar device.

It is contemplated that the global positioning system transmitter 48 can communicate data including: when a lightweight non-electric magnetically attractable component is magnetically engaged, when a lightweight non-electric magnetically attractable component is magnetically disengaged, the frequency of magnetic engagement and disengagement of a lightweight non-electric magnetically attractable component, other use data associated with the lightweight non-electric magnetically attractable components, or combinations thereof.

Turning now to FIG. 1, a flow chart showing an embodiment of the steps of the present method is depicted.

Step 100 includes removably inserting a first lightweight non-electric magnetically attractable component with a first face into a first portable item, forming a first lightweight non-electric magnetically attractable item.

Step 102 includes removably inserting a second lightweight non-electric magnetically attractable component with a second face into a second portable item, forming a second lightweight non-electric magnetically attractable item.

Step 104 includes allowing the first lightweight non-electric magnetically attractable item to magnetically engage the second lightweight non-electric magnetically attractable item, forming a detachable magnetic assembly.

Figure 2A:
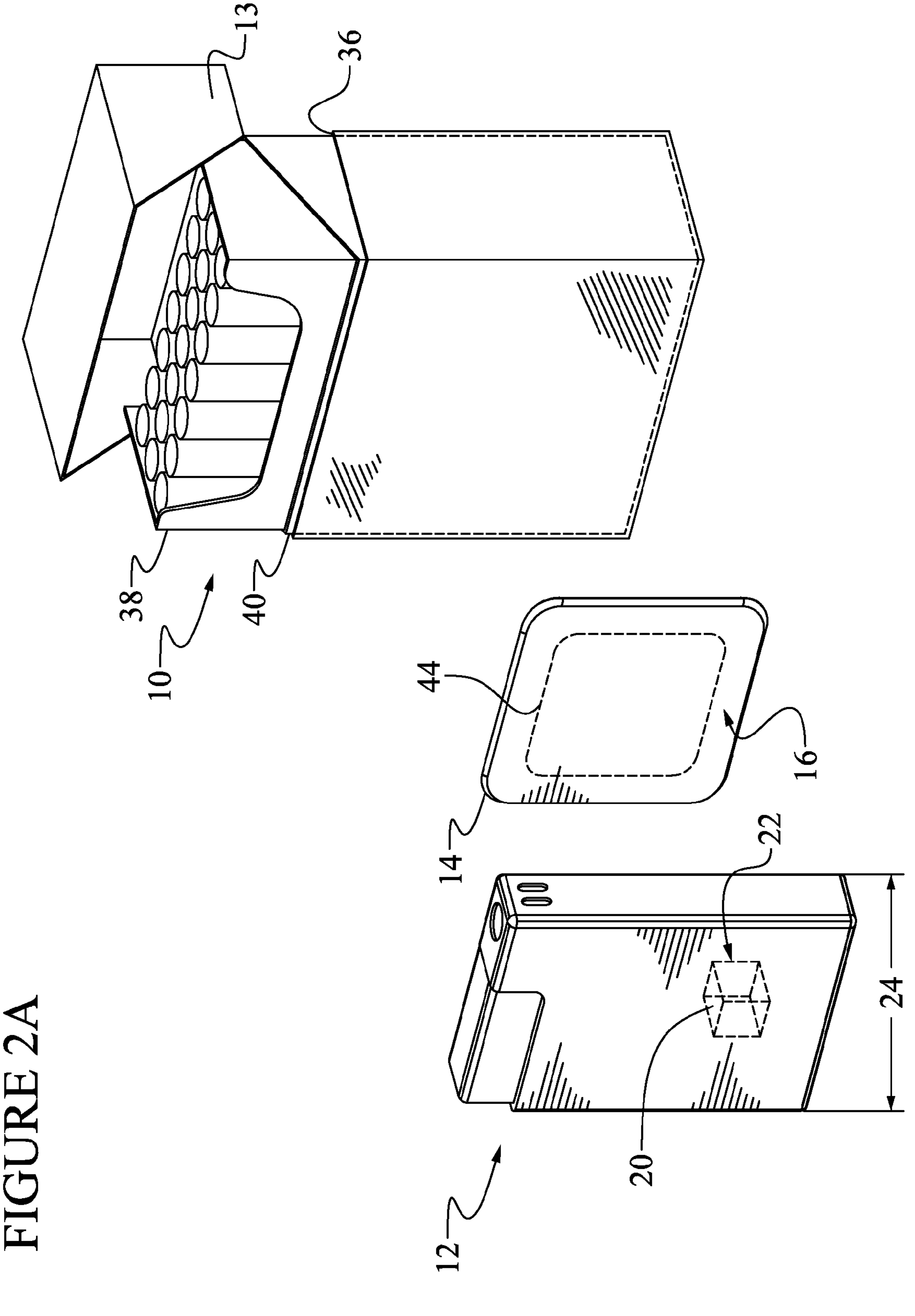
FIGS. 2A, 2B and 2C depict an apparatus usable in the present method.

FIG. 2A depicts an apparatus usable in the present method. A first portable item 10, here shown to be a cigarette box, is depicted. The first portable item 10 is depicted having a flap 13 and a lower packaging 40. A clear film 36 is depicted disposed over the lower packaging 40. In this example the clear film 36 can be a cellophane wrapper around the cigarette box, however it is not limited to this particular embodiment. The first portable item 10 is also depicted comprising an upper packaging 38.

A first lightweight non-electric magnetically attractable component 14 is depicted with a first face 16 and a printed portion 44.

A second portable item 12 is depicted. A second lightweight non-electric magnetically attractable component 20 with a second face 22 is depicted disposed within the second portable item 12, thereby forming a second lightweight non-electric magnetically attractable item 24.

Figure 2B:
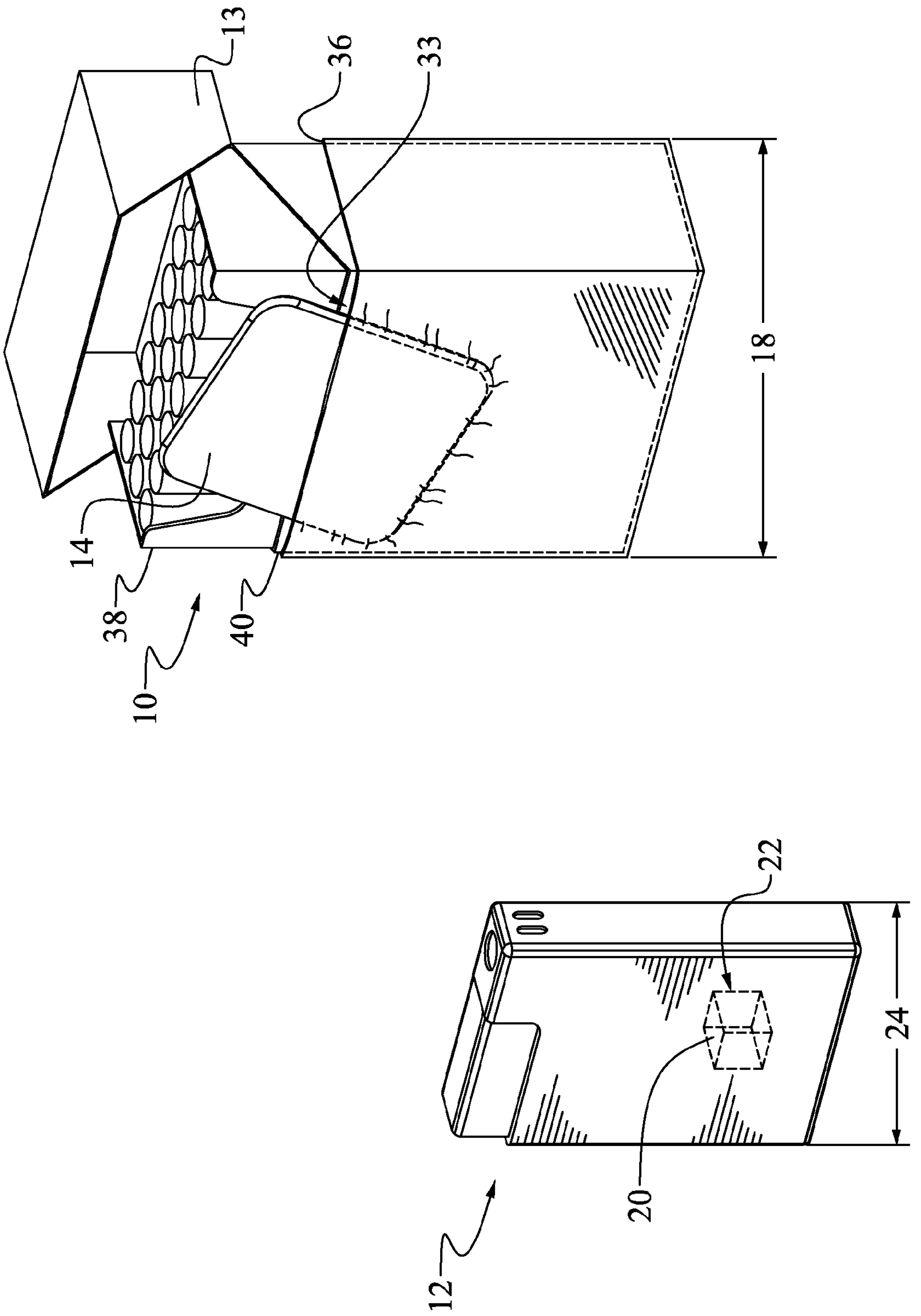

FIG. 2B depicts the apparatus usable in the present method that is depicted in FIG. 2A, wherein the first lightweight non-electric magnetically attractable component 14 is partially inserted within a chamber 33 of the first portable item 10, thereby forming a first lightweight non-electric magnetically attractable item 18. The chamber 33 comprises the volume between the lower packaging 40 and the clear film 36.

Figure 2C:
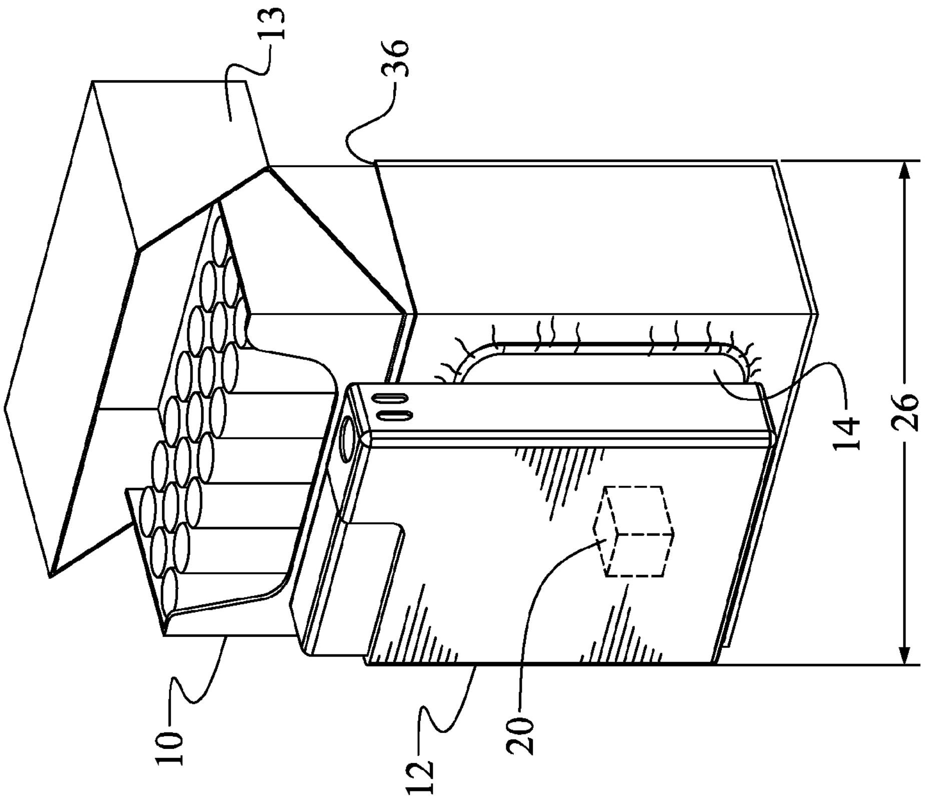

FIG. 2C depicts the apparatus usable in the present method that is depicted in FIGS. 2A and 2B, but in magnetic engagement with one another, thereby forming a detachable magnetic assembly 26. In FIG. 2C the first lightweight non-electric magnetically attractable component 14 is fully inserted within the chamber 33.

Figure 3A:
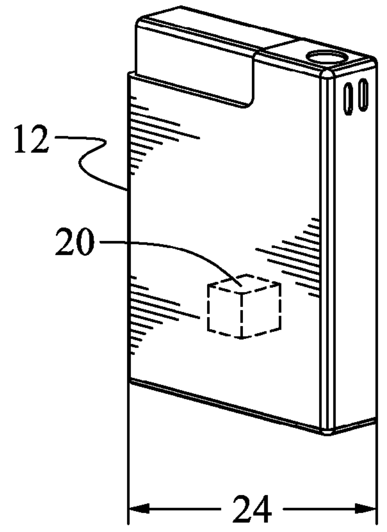
FIGS. 3A, 3B, 3C and 3D depict an apparatus usable in an alternate embodiment of the present method.

FIG. 3A depicts the second lightweight non-electric magnetically attractable item 24 substantially as depicted in FIG. 2B.

Figure 3B:
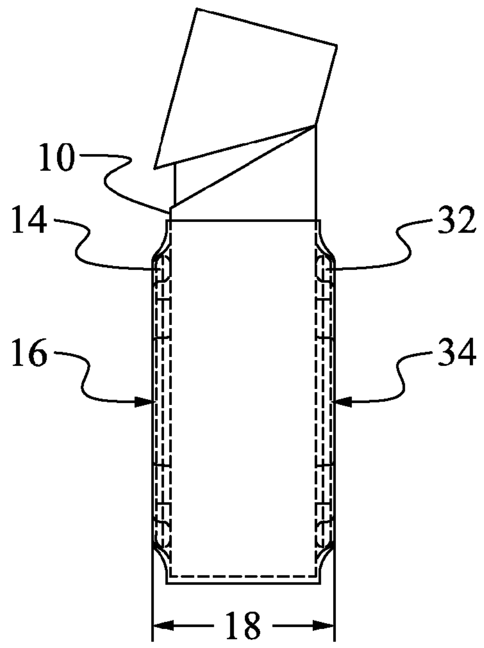

FIG. 3B depicts the first lightweight non-electric magnetically attractable item 18 with the first lightweight non-electric magnetically attractable component 14 inserted fully within the chamber 33 and a third lightweight non-electric magnetically attractable component 32 with a third face 34 inserted within the chamber 33 distal the first lightweight non-electric magnetically attractable component 14.

Figure 3C:
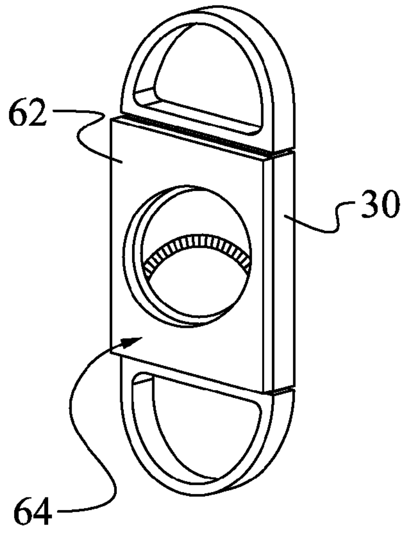

FIG. 3C depicts a third portable item 30 comprising a fourth lightweight non-electric magnetically attractable component 62 with a fourth face 64.

Figure 3D:
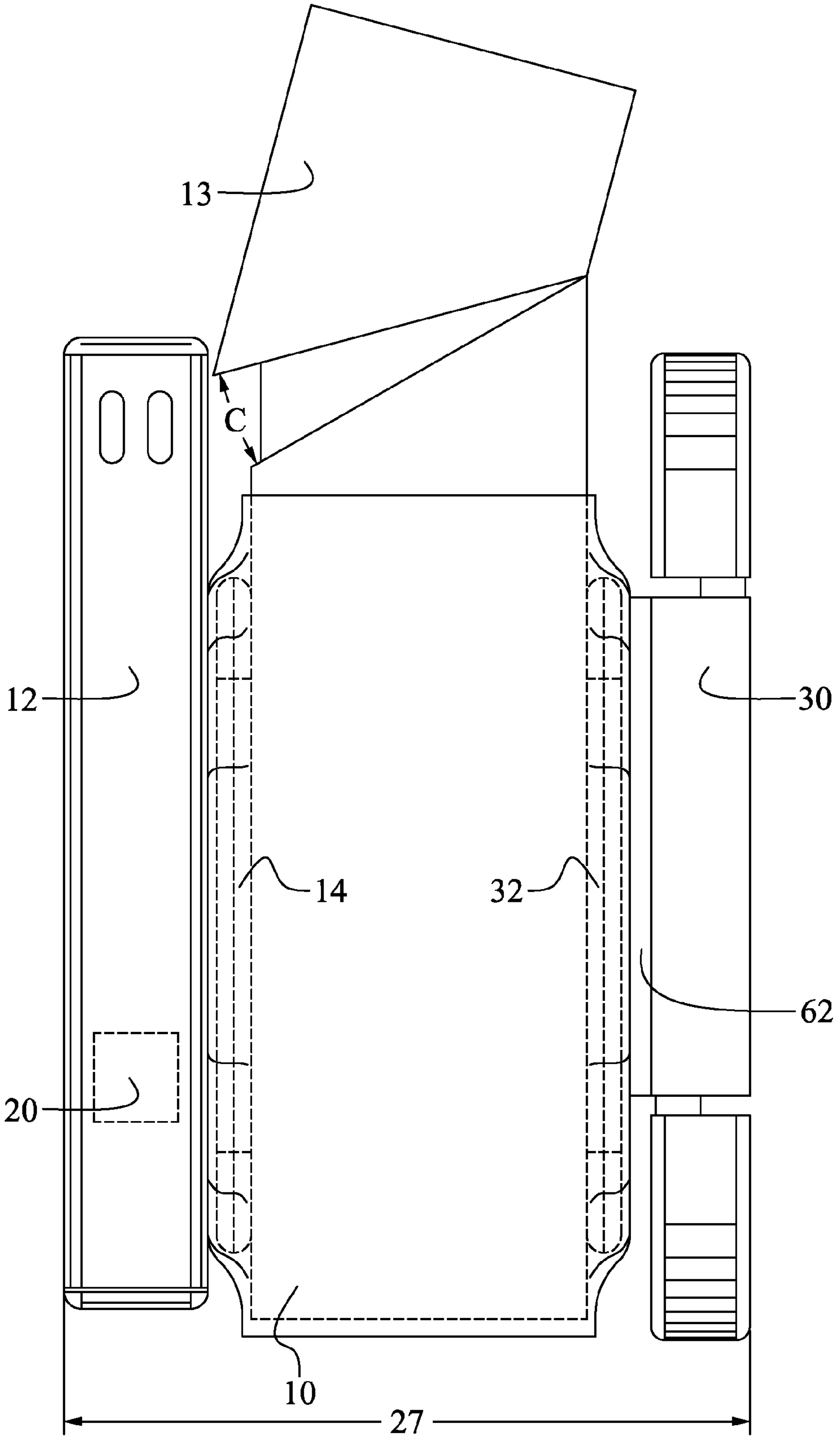

FIG. 3D depicts the first 10, second 12, and third 30 portable items depicted in FIGS. 3A, 3B, and 3C magnetically engaged with one another. The first portable item 10 is magnetically engaged with the second portable item 12. The first portable item 10 is further magnetically engaged with the third portable item 30 distal the second portable item 12.

More specifically, magnetic engagement occurs between the first lightweight non-electric magnetically attractable component 14 and the second lightweight non-electric magnetically attractable component 20. Magnetic engagement further occurs between the third lightweight non-electric magnetically attractable component 32 and the fourth lightweight non-electric magnetically attractable component 62 forming a detachable magnetic assembly 27 comprising three portable items.

FIG. 3D depicts a detachable magnetic assembly 27 usable in the present method to fasten the flap 13 of the first portable item 10. The flap 13 is prevented from opening do to the positioning of the second portable item 12 in front of the flap 13 when the second portable item 12 is in magnetic engagement with the first portable item 10. Line 'C' depicts the maximum extent of movement of the flap 13 in this particular embodiment.

Figure 4:
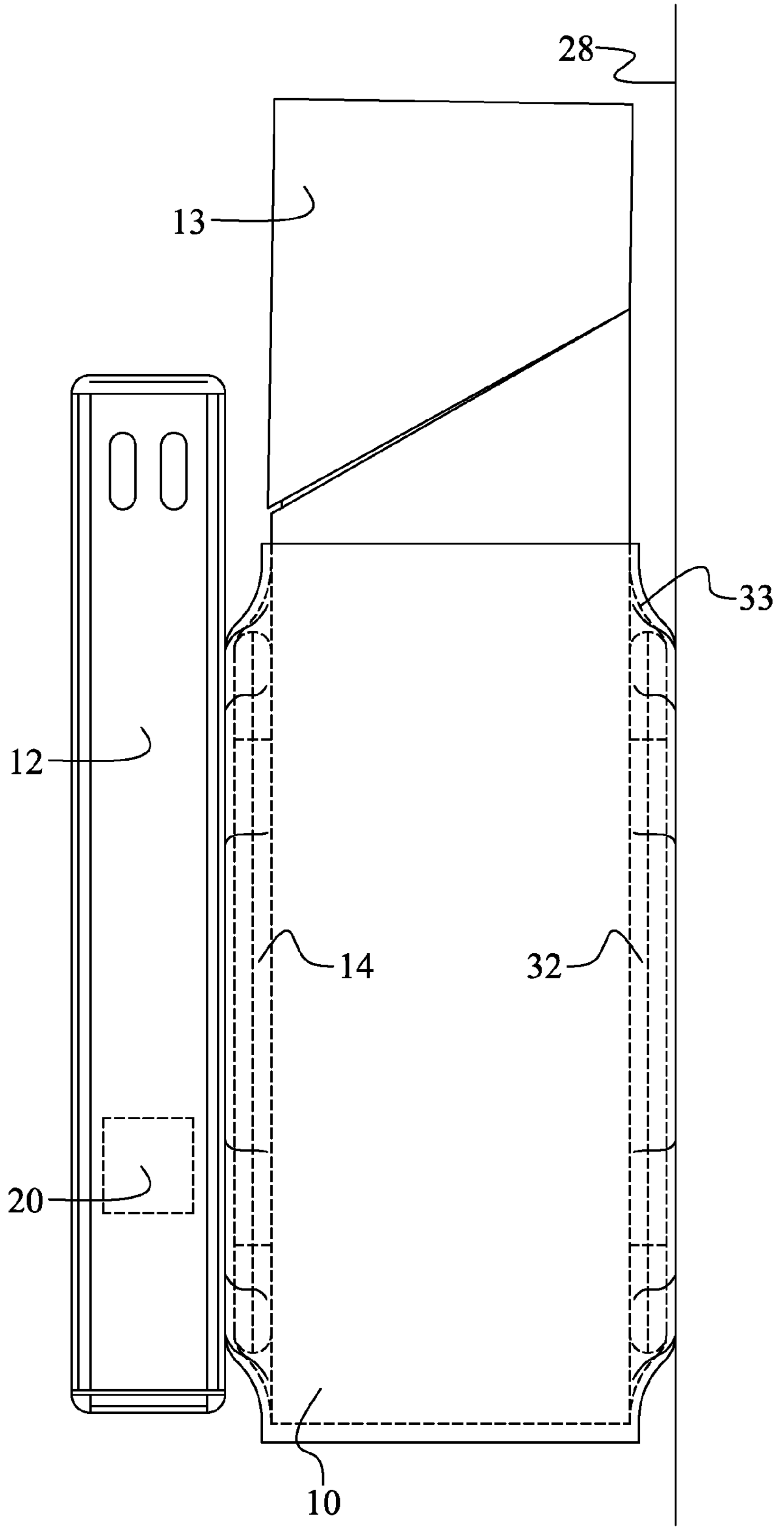
FIG. 4 depicts an apparatus usable in and alternate embodiment of the present method.

FIG. 4 depicts an apparatus usable in the present method substantially similar to the apparatus depicted in FIG. 2C, however, wherein the flap 13 is in a closed position. The first portable item 10 is depicted with a third lightweight non-electric magnetically attractable component 32 disposed within chamber 33 distal the first lightweight non-electric magnetically attractable component 14. The third lightweight non-electric magnetically attractable component 32 is further depicted in magnetic engagement with a magnetic surface 28.

Turning now to FIGS. 5A, 5B, 5C, and 5D, it should be noted that although the first lightweight non-electric magnetically attractable component 14 is depicted, any of the various lightweight non-electric magnetically attractable components could be formed in the same or a substantially similar manner. It should be further noted that, although the first lightweight non-electric magnetically attractable component 14 is depicted as a substantially square shaped object, it can be contemplated that the lightweight non-electric magnetically attractable components can have various other shapes as well.

Figure 5A:
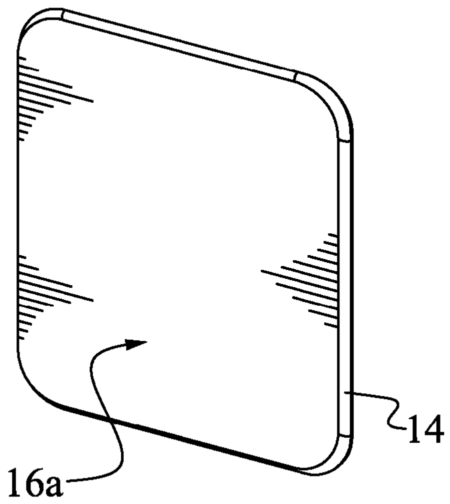
FIGS. 5A, 5B, 5C and 5D depict various embodiments of lightweight non-electric magnetically attractable components usable in present method.

FIG. 5A depicts a first lightweight non-electric magnetically attractable component 14 usable in the present method. The embodiment depicted in FIG. 5A is shown with a smooth first face 16*a*.

Figure 5B:
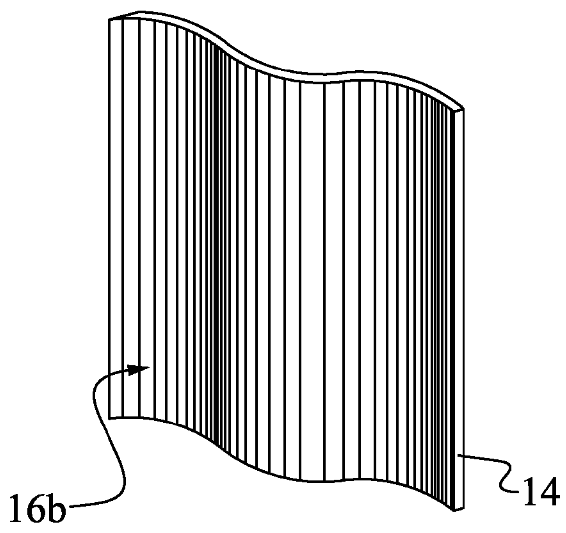

FIG. 5B depicts the first lightweight non-electric magnetically attractable component 14 with an undulated first face 16*b*.

Figure 5C:
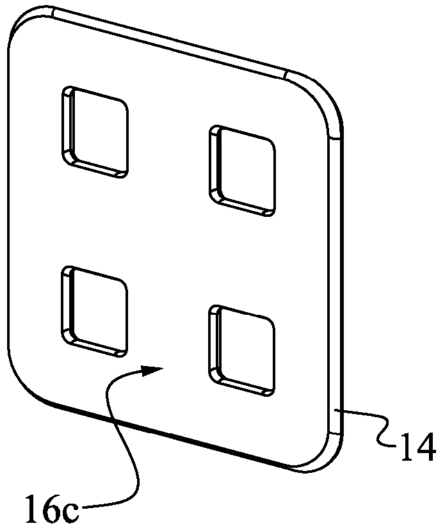

FIG. 5C depicts the first lightweight non-electric magnetically attractable component 14 with a perforated first face 16*c*.

Figure 5D:
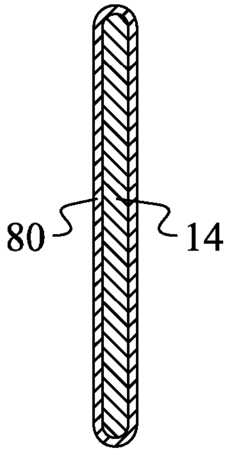

FIG. 5D depicts the first lightweight non-electric magnetically attractable component 14 with a coating 80 disposed over the first lightweight non-electric magnetically attractable component 14.

Figure 6:
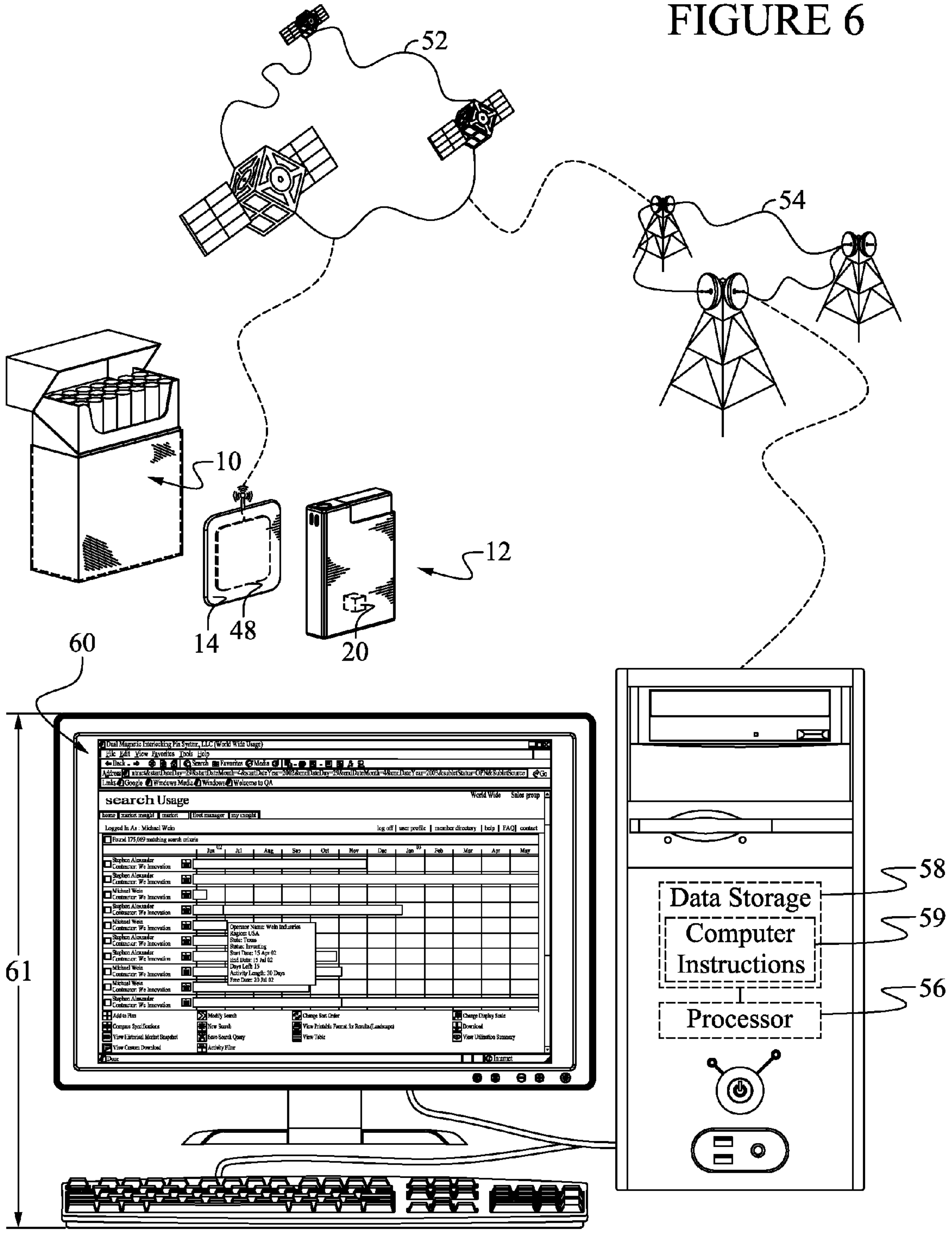
FIG. 6 depicts an embodiment of a system usable with the present method.

FIG. 6 depicts an embodiment a system usable in the present method. The embodiment depicted comprises a first lightweight non-electric magnetically attractable component 14 which comprises a global positioning system transmitter 48.

The first lightweight non-electric magnetically attractable component 14 is depicted not yet inserted within the chamber 33 of the first portable item 10, however, it is contemplated that the first lightweight non-electric magnetically attractable component 14 with the global positioning system transmitter 48 can be inserted into the chamber 33 of the first portable item 10 substantially as described with respect to other embodiments.

The global positioning system transmitter 48 can be in communication with a GPS satellite network 52 which can further be in communication with a global communication network 54. The global communication network 54 can be in communication with at least one processor 56. The at least one processor 56 can be in communication with a data storage 58. The data storage 58 can have computer instructions 59. The processor 56 can further be in communication with a client device 61 which can comprise an executive dashboard 60. The client device 61 can be a computer, a laptop, a cellular based communications device, a cellular phone, or any other suitable or similar device.

The executive dashboard 60 can be a monitor, a screen, a display, a television, or any other suitable or similar device.

In operation, the computer instructions can instruct the processor 56 to operate the executive dashboard 60 showing worldwide usage of each detachable magnetic assembly. Use of the lightweight non-electric magnetically attractable components can therefore be remotely monitored and analyzed.

While these embodiments have been described with emphasis on the embodiments, it should be understood that within the scope of the appended claims, the embodiments might be practiced other than as specifically described herein.

What is claimed is:

1. A method for removably attaching a first portable item to a second portable item, wherein the second portable item is usable in association with the first portable item, wherein the method comprises the steps of:

a. removably inserting a first lightweight non-electric magnetically attractable component with a first face into the first portable item, forming a first lightweight non-electric magnetically attractable item;

b. removably inserting a second lightweight non-electric magnetically attractable component with a second face into the second portable item, forming a second lightweight non-electric magnetically attractable item; and c. allowing the first lightweight non-electric magnetically attractable item to magnetically engage the second lightweight non-electric magnetically attractable item, forming a detachable magnetic assembly, wherein the first and second lightweight non-electric magnetically attractable components each comprise a global positioning system transmitter communicating with a GPS satellite network, and a global communication network, and at least one processor associated with at least one data storage, and wherein the data storage has computer instructions instructing the processor to operate an executive dashboard showing worldwide usage of each lightweight non-electric magnetically attractable component.

* * * * *